3,825,440
VAPOR DEPOSITION METHOD
Louis E. Branovich, Neptune, William B. P. Fitzpatrick, Wall, and Martin L. Long, Jr., West Belmar, N.J., assignors to the United States of America as represented by the Secretary of the Army
No Drawing. Continuation-in-part of application Ser. No. 159,067, July 1, 1971, which is a continuation-in-part of application Ser. No. 821,466, May 2, 1969, both now abandoned. This application Apr. 3, 1973, Ser. No. 347,600
Int. Cl. C23c 11/14
U.S. Cl. 117—106 R     4 Claims

ABSTRACT OF THE DISCLOSURE

Isotropic boron nitride is vapor deposited onto a substrate by suspending the substrate in a hot reaction chamber the inner walls of which bear a deposit of anisotropic boron nitride, and adding either water or ammonium hydroxide to the reaction chamber while the temperature of of the reaction chamber is maintained at about 850 degrees C. to about 1600 degrees C.

BACKGROUND OF THE INVENTION

This application is a continuation-in-part of the application of Louis E. Granovich, William B. P. Fitzpartrick and Martin L. Long, Jr., Ser. No. 159,067, filed July 1, 1971 for "Vapor Deposition Method" and assigned to a common assignee and now abandoned which in turn was a continuation-in-part of the application of Louis E. Branovich, William B. P. Fitzpatrick and Martin L. Long, Jr., Ser. No. 821,466, filed May 2, 1969 for "Vapor Deposition Method," assigned to a common assignee and since abandoned.

This invention relates to a method of vapor depositing isotropic boron nitride onto a substrate.

It has been recognized that boron nitride is an insulator material having characteristics desirable for use in microelectronic applications, electron tubes, hybrid electronic devices, and as a structural suport element in missile systems. The most desirable form of boron nitride that exhibits the above characteristics is the isotropic form in which there is no variation in characteristics with orientation. To date, the art has not disclosed a suitable method of making isotropic boron nitride.

The object of this invention is to provide a simple method of vapor depositing isotropic boron nitride.

SUMMARY OF THE INVENTION

Isotropic boron nitride is vapor deposited onto a substrate by suspending the substrate in a hot reaction chamber the inner walls of which bear a deposit of anisotropic boron nitride, and adding either water or ammonium hydroxide to the reaction chamber, while the temperature of the reaction chamber is maintained at about 850 degrees C. to about 1600 degrees C.

BRIEF DESCRIPTION OF THE PREFERRED EMBODIMENT

A cylindrical reaction chamber of two inch diameter and four inch length is provided with suitable vapor entrance lines leading directly into the reaction chamber and with a graphite heater for resistance heating of the reaction chamber. Boron trichloride vapor and ammonia vapor are then introduced into the reaction chamber at a temperature of 1300 to 1600 degrees C. and in the molar ratio of one mole boron trichloride to four moles ammonia causing anisotropic obron nitride to deposit on the inner walls of the reaction chamber. The anisotropic boron nitride deposit is characterized by impurity concentrations of less than 0.2 percent and a density of about 1.7 to 2.1 grams per cubic centimeter. The thickness of the anisotropic boron nitride deposit is not critical but rather is dependent on the amount desired of deposited isotropic boron nitride.

A flat graphite substrate one quarter inch by one inch by three inches is then suspended by a piece of tungsten wire in the reaction chamber. Water is then added to the reaction chamber through an entrance line in vaporous form using nitrogen as a carrier gas while the reaction chamber is maintained at a temperature of about 1400 degrees C. to about 1600 degrees C. causing isotropic boron nitride to deposit onto the substrate. The isotropic boron nitride deposit is characterized by no variation in physical characteristics such as thermal conductivity, electrical resistivity, electrical conductivity, etc. with orientation. The amount of water added is dependent on the amount of isotropic boron nitride one wishes to deposit. Generally, five cc. of liquid water is added per hour to approximately twenty-four square inches of surface of anisotropic boron nitride deposit having a thickness of approximately ten mils.

The method makes use of the equation:

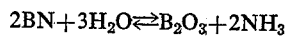
$$2BN + 3H_2O \rightleftharpoons B_2O_3 + 2NH_3$$

In the method, the relationship between the dimensions of the substrate to be coated and the dimensions of the hot reaction chamber in which the substrate is suspended is not critical. Generally, one uses as small a reaction chamber as possible. This is because a smaller reaction chamber has a lower thermal power requirement and smaller volumes of compounds and gases. When using a smaller reaction chamber, one suspends therein a substrate of such size that one obtains maximum heat transfer from the heat source throughout the reaction chamber.

The mechanism involved in the method is believed to be as follows:

The water vapor that is added to the reaction chamber at the operating temperature of about 1400 degrees C. to about 1600 degrees C. reacts with the anisotropic boron nitride to form ammonia and liquid boric oxide. The liquid boric oxide forms a thin viscous layer over the entire surface of the anisotropic boron nitride. At the operating temperatures, some of the liquid boric oxide evaporates. During this evaporation, the vaporous boric oxide is free to deposit on the graphite substrate. As the vaporous boric oxide deposits on the graphite substrate, it reacts with the ammonia vapor to form isotropic boron nitride on the substrate. The equilibrium conditions are such that isotropic boron nitride then builds upon the graphite substrate.

Various modifications are seen as coming within the scope of the invention. For example, instead of graphite, tungsten may be used as the substrate. Then too, instead of a cylindrical reaction chamber, one might use other shaped reaction chambers.

We wish it to be understood that we do not desire to be limited to the exact details of construction shown and described, for obvious modifications will occur to a person skilled in the art.

What is claimed is:

1. A method of vapor depositing a coating of isotropic boron nitride onto a substrate including the steps of:
    (A) suspending a substrate taken from the group consisting of tungsten and graphite in a hot reaction chamber the inner walls of which bear a deposit of anisotropic boron nitride, and
    (B) adding a member selected from the group consisting of water and ammonium hydroxide in vaporous form using nitrogen as a carrier gas to the reaction chamber while the reaction chamber is maintained at a temperature of about 1400 degrees C. to about 1600 degrees C. to form ammonia and liquid boric oxide. Said liquid boric oxide then forming a thin viscous layer over the entire surface of the anisotropic boron nitride, some of said liquid boric oxide then evaporating and reacting in the vaporous form with the ammonia vapor to form isotropic boron nitride on the substrate.

2. A method according to Claim 1 wherein the substrate is graphite.

3. A method according to Claim 1 wherein water is added to the reaction chamber.

4. A method according to Claim 1 wherein ammonium hydroxide is added to the reaction chamber.

References Cited
UNITED STATES PATENTS

| | | |
|---|---|---|
| 3,131,089 | 4/1964 | Grulke et al. ____ 117—106 R X |
| 3,531,678 | 9/1970 | Schiavone _____ 117—106 R X |
| 3,573,969 | 6/1971 | Camahort et al. ___ 117—106 R |
| 3,634,132 | 1/1972 | Camahort et al. __ 117—106 R X |

LEON D. ROSDOL, Primary Examiner

H. A. PITLICK, Assistant Examiner

U.S. Cl. X.R.

117—169 R, Dig. 10; 423—290